United States Patent [19]
Rack

[11] 3,755,964
[45] Sept. 4, 1973

[54] MULTIPLE-PLANT SUBSTRATE BODY
[76] Inventor: David Rack, 17 Schwarzgrabenweg, Salzburg, Austria
[22] Filed: Jan. 7, 1972
[21] Appl. No.: 216,018

[30] Foreign Application Priority Data
Jan. 13, 1971 Austria .............................. A 209/71

[52] U.S. Cl.................. 47/37, 47/34.13, 47/DIG. 7, 229/2.5
[51] Int. Cl............................................. A01g 9/02
[58] Field of Search................. 229/2.5; 206/46 FC; 47/37, 34.13, 56, DIG. 7, 34.11

[56] References Cited
UNITED STATES PATENTS

| | | |
|---|---|---|
| 3,172,234 | 3/1965 | Eavis............................. 47/34.13 X |
| 2,988,441 | 6/1961 | Pruitt............................... 47/DIG. 7 |
| 3,355,084 | 11/1967 | Donovan........................... 229/2.5 X |
| 3,288,278 | 11/1966 | Rich et al. ....................... 206/46 FC |
| 3,524,279 | 8/1970 | Adams.............................. 47/34.13 |
| 3,660,934 | 5/1972 | Pollack et al. ..................... 47/34.11 |

Primary Examiner—Robert E. Bagwill
Attorney—Kurt Kelman

[57] ABSTRACT

A skeleton is provided, which forms a wrapper and has thin walls which define a plurality of chambers. The skeleton consists of elastic porous foam through which plants can grow. Soillike plant substrate material is contained in said chambers. Cover means close said chambers to prevent an escape of said substrate material therefrom.

3 Claims, 1 Drawing Figure

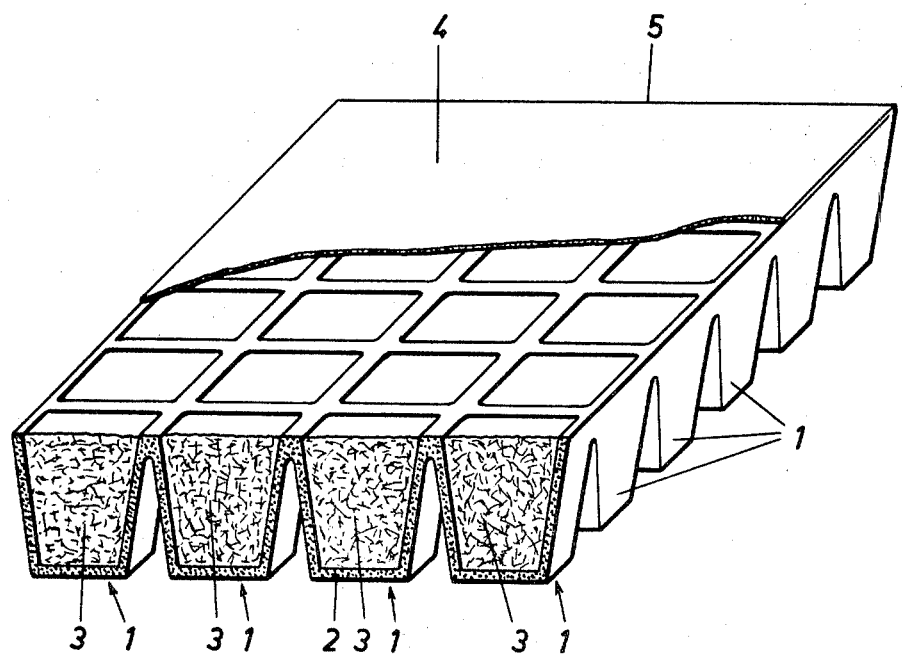

MULTIPLE-PLANT SUBSTRATE BODY

This invention relates to a multiple-plant substrate body, which consists of a thin-walled body which defines a plurality of chambers filled with soillike plant substrate material.

To enable an efficient cultivation of a large number of plante, pots have been disclosed which consist of plastics material and form a multiplicity of chambers, which are filled with plant substrate material. A plant in the form of a seed or seedling is inserted into each chamber, which is filled with standardized soil or peat-containing soil, and the plant remains in said chamber until it is transplanted. Before the plant is transplanted, e.g., into the open, the plants must be removed from these plastic pots because the rootstock cannot grow through the plastic walls which define the chambers. In removing the plants, care must be taken not to damage the root ball so that an undisturbed continued growth of the plant is ensured. These disadvantages cannot be offset by the advantages which are due to the fact that the plastic pots can be used repeatedly because the repeated use of the plastic pots involves the danger that molds grow in the plastic pots and may infect the next plants. Besides, these plastic pots can hardly be used for a shipment of the plant because the soil filled in the chambers of the plastic pot falls out when the plastic pot falls aside or is tilted.

To eliminate above all the disadvantages which are due to the fact that the plants must be removed from the plastic pots before they are transplanted into the native soil, plant pots have been developed which comprise a multiplicity of chambers, which are defined by paper walls and are disposed one beside the other and one behind the other and open on top and at the bottom. These plant pots must be placed on a suitable base, e.g., an aluminum plate, before they are filled with soil. Care must be taken to establish an intimate contact between the soil and the wall of the top so that a firm ball can be formed which can be transported. The plants which are inserted into these soil-filled chambers defined by paper walls can be transplanted into the native soil without need to remove the plants from the pot because the rootstock can grow downwardly into the native soil without obstruction and the paper which forms the root pot rots in the course of time. This advantage cannot ensure, however, an unhindered continued growth of the rootstock in all directions when the plant has been transplanted and is offset by the disadvantage that these plant pots must be packaged in separate containers for shipment because the root balls are not sufficiently held together in the chamber defined by paper walls and would be destroyed. To simplify these plant pots, the paper walls defining adjacent chambers are bonded with a water-soluble glue so that the several chambers separate when the plants have been watered. This has the disadvantage that each chamber must be separately packaged before it is shipped. Besides, the plants cannot be cleanly stored in these pots under clean conditions because soil will inevitably trickle from the chambers which are open at the bottom.

It is an object of the invention to eliminate these disadvantages and to provide a plant substrate body which contains soil, peat and the like as a main plant substrate constituent and which can be shipped without a separate package and can be stored under clean conditions and can be directly transplanted into native soil.

In a multiple-plant substrate body of the kind described first hereinbefore, the invention accomplishes the above object in that the skeleton serves also as a wrapper and consists of elastic, porous foam, through which the plants can grow, e.g., of a polyether-polyurethane foam having a low specific gravity, each chamber is covered to prevent an escape of crumbs, and the skeleton is adapted to be divided into single-plant substrate bodies corresponding to individual chambers, if this is desired. Depending on the time at which the plant (seed, seedling, shoot, sprout, tuber or the like) is inserted into the substrate body, it will be sufficient if the gardener covers the substrate body or only inserts the plant into the substrate body which is closed on all surfaces. In the former case the plant together with the soillike plant substrate material is inserted into the body and in the second case the plant is inserted into the substrate body which is closed on all surfaces.

The plant substrate body according to the invention may be covered by a fine-mesh grid, network, woven fabric or non-woven fabric of natural or synthetic fibers or metal and this cover may be bonded to the shell by adhering, welding or mechanical means by means of clips so as to prevent an escape of crumbs. Particularly desirable results will be obtained if the means for covering each chamber consist just as the shell of polyurethane foam which comprises polyester or polyether because each root ball will then be surrounded by a uniform enclosure.

The fast that the soillike plant substrate material is enclosed on all sides affords the advantage that the substrate bodies can be handled efficiently and cleanly. The plant substrate bodies are protected from shock and well heat-insulated and have a high dimensional stability so that a separate package for shipping the plants is not required. The plants can grow well through the cover consisting of polyurethane foam comprising polyester or polyether and plant nutrients may be embedded in the foam to ensure that the nutrition of the plant will not be changed as it grows through the enclosure. This ensures an unhindered growth of the plant, a good supply of air thereto, and a good control of the water supply also when the plant has been transplanted into the native soil.

An illustrative embodiment of the invention is diagrammatically shown on the accompanying drawing in a perspective view, partly in section.

The multiple-plant substrate body according to the invention consists of a thin-walled skeleton 2 of polyurethane foam comprising polyester or polyether and having a low specific gravity of about 18–50 kilograms per cubic centimeter. The skeleton has thin walls which define a plurality of chambers 1, which are filled with a soillike substrate 3, which contains all substances that are essential for the nutrition of the plant. The chambers 1 are crumbtightly closed by a cover 4 so that the soillike plant substrate material is enclosed on all surfaces and the material is protected from shaking, well heat-insulated and has a high dimensional stability.

To manufacture the multiple-plant substrate body according to the invention, the mass-produced prefabricated skeletons are filled with soillike plant substrate material, which contains suitable fertilizer, and are crumbtightly closed by means of the cover. The plant may be inserted before or after the chambers have been closed.

Particularly simple conditions will be obtained if the cover 4 for each chamber 3 is hinged to the skeleton 2 at one edge because it is then sufficient to swing the cover over the skeleton and then to bond the cover to the skeleton. If the cover consists of the same porous foam as the skeleton 2, the cover 4 may be integrally formed with the skeleton along the edge 5. This affords additional advantages.

When it is desired to insert the plant into the plant substrate body when the same has been closed, a small opening is cut into the cover or into the bottom of the skeleton. When the plant substrate body is turned upside down to rest on the cover, the plant may be inserted through the bottom of the skeleton so that more plant substrate material is available for the rootstock of the plant because the chambers 1 flare upwardly.

Before the plants are shipped or before the plants are transplated into the native soil, the plant substrate body may be cut into single-plant substrate bodies as may be required. Each single-plant substrate body is then also crumb-tightly closed and has the same advantages as the multiple-plant substrate body.

It will be understood that the invention is not restricted to the embodiment shown in the drawing. As has been mentioned, the cover for the skeleton could consist of a fine-mesh grid or of a woven or non-woven fabric and might be bonded to the skeleton by tacking, adhering or welding. For this purpose, the top edges of the skeleton may be provided with steps which fit the cover applied to the skeleton. Instead of providing such a crumbtight cover, the skeleton which contains the plant substrate material and the plants may be closed by plastic material sheeting, e.g., in a shrinking step. In this case, the cover sheeting is cut open by knife cuts at the growing points of the plants before the substrate body is transplanted into the native soil so that the bud can grow through the cover.

What is claimed is:

1. A multiple-plant substrate body, which comprises
   a skeleton forming a wrapper and having thin walls which define a plurality of chambers, said skeleton consisting of elastic water porous synthetic resin foam through which plants can grow,
   soillike plant substrate material contained in said chambers, and
   cover means of synthetic resin foam closing said chambers to prevent an escape of said substrate material therefrom.

2. A multiple-plant substrate body as set forth in claim 1, in which said skeleton consists of polyether-polyurethane foam having a low specific gravity.

3. A multiple-plant substrate body as set forth in claim 1, in which said skeleton and cover means consist of a material selected from the class consisting of polyurethane foams containing polyesters and polyethers.

* * * * *